US008504795B2

(12) United States Patent
Shah et al.

(10) Patent No.: US 8,504,795 B2
(45) Date of Patent: Aug. 6, 2013

(54) METHOD, SYSTEM, AND PROGRAM FOR UTILIZING A VIRTUALIZED DATA STRUCTURE TABLE

(75) Inventors: Hemal V. Shah, Austin, TX (US); Ali S. Oztaskin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 546 days.

(21) Appl. No.: 10/882,564

(22) Filed: Jun. 30, 2004

(65) Prior Publication Data

US 2006/0004795 A1    Jan. 5, 2006

(51) Int. Cl.
*G06F 12/00*    (2006.01)
*G06F 9/26*    (2006.01)
*G06F 9/34*    (2006.01)

(52) U.S. Cl.
USPC ..... 711/206; 711/202; 711/203; 711/E12.061

(58) Field of Classification Search
None
See application file for complete search history.

(56) References Cited

U.S. PATENT DOCUMENTS

| | | | |
|---|---|---|---|
| 6,105,113 A | | 8/2000 | Schimmel |
| 6,163,834 A | * | 12/2000 | Garcia et al. ................. 711/206 |
| 6,725,289 B1 | | 4/2004 | Waldspurger et al. |
| 2002/0144001 A1 | | 10/2002 | Collins et al. |
| 2003/0115423 A1 | | 6/2003 | Chang |
| 2003/0163647 A1 | | 8/2003 | Cameron et al. |
| 2003/0200413 A1 | | 10/2003 | Gurumoorthy et al. |
| 2004/0168038 A1 | | 8/2004 | Collins et al. |
| 2005/0080928 A1 | | 4/2005 | Beverly et al. |
| 2005/0144402 A1 | | 6/2005 | Beverly |
| 2005/0216597 A1 | | 9/2005 | Shah et al. |
| 2006/0004941 A1 | | 1/2006 | Shah et al. |
| 2006/0004983 A1 | | 1/2006 | Tsao et al. |
| 2006/0136697 A1 | | 6/2006 | Tsao et al. |
| 2006/0149919 A1 | | 7/2006 | Arizpe et al. |

OTHER PUBLICATIONS

PCT International Search Report and Written Opinion, Jan. 31, 2006, for International Application No. PCT/US2005/022361.
Recio, R., "RDMA Enabled NIC (RNIC) Verbs Overview", [onlline]; Apr. 29, 2003, [Retrieved on Mar. 11, 2004], retrieved from the Internet at <URL: http://www.rdmaconsortium.org/home/RNIC_Verbs_Overview2.pdf>.

(Continued)

*Primary Examiner* — Edward Dudek, Jr.
*Assistant Examiner* — Matthew Chrzanowski
(74) *Attorney, Agent, or Firm* — Konrad Raynes Davda & Victor LLP

(57) ABSTRACT

Provided are a method, system, and program for utilizing a virtualized data structure table such as an address translation and protection table (TPT), for example, in an I/O device. The virtualized data structure table has virtually contiguous data structures but not necessarily physically contiguous data structures in system memory. The data structure table may be accessed in a virtually contiguous manner. In the illustrated embodiment, the table is subdivided at a first hierarchal level into a plurality of virtually contiguous units or segments. Each unit or segment is in turn subdivided at a second hierarchal level into a plurality of virtually contiguous subunits, subsegments, pages or blocks. Each page or block is in turn subdivided at a third hierarchal level into a plurality of physically contiguous table entries. The data structure table may be accessed in a virtually contiguous manner utilizing a set of hierarchal data structure tables corresponding to the hierarchal levels of the data structure table.

50 Claims, 11 Drawing Sheets

OTHER PUBLICATIONS

Buonadonna, P., and D. Culler, "Queue Pair IP: A Hybrid Architecture for System Area Networks", Proceedings of the 29th Annual International Symposium on Computer Architecture, 2002, pp. 247-256.

Correia, P., "Developing a Third Generation I/O Specification", Intel Developer Update Magazine, Mar. 2002, pp. 1-4.

Culley, P., U. Elzur, R. Recio, & S. Bailer, "Marker PDU Aligned Framing for TCP Specification (Version 1.0)," Release Specification of the RDMA Consortium, Oct. 25, 2002, 32 pp.

Deyring, K. (Ed.), "Serial ATA: High Speed Serialized AT Attachment", Rev. 1.0, Aug. 29, 2001, 36 pp.

Hilland, J., P. Culley, J. Pinkerton, & R. Recio, "RDMA Protocol Verbs Specification (Version 1.0)," Release Specification of the RDMA Consortium, Apr. 2003, 243 pp.

Institute of Electrical and Electronics Engineers (IEEE), "IEEE Std 802.11b- 1999", Supplement to ANSI/IEEE Std. 802.11, 1999 Edition, Sep. 16, 1999, 17 pp.

Institute of Electrical and Electronics Engineers (IEEE), "IEEE Std 802.3- 2002", Revision of IEEE Std. 802.3, 2000 Edition, Mar. 8, 2002, 33 pp.

InfiniBand, "InfiniBand Architecture Specification vol. 1", Release 1.0, Oct. 24, 2000, Ch. 1-8, pp. 1-195.

InfiniBand, "InfiniBand Architecture Specification vol. 1", Release 1.0, Oct. 24, 2000, Ch. 9-10, pp. 196-445.

InfiniBand;"InfiniBand Architecture Specification vol. 1", Release 1.0, Oct. 24, 2000, Ch. 11-14, pp. 446-669.

InfiniBand, "InfiniBand Architecture Specification vol. 1", Release 1.0, Oct. 24, 2000, Ch. 15-20, pp. 670-880.

InfiniBand, "InfiniBand Architecture Specification vol. 2", Release 1.0, Oct. 24, 2000, Ch. 1-11, pp. 1-319.

InfiniBand, "InfiniBand Architecture Specification vol. 2", Release 1.0, Oct. 24, 2000, Ch. 12-Appendix D, pp. 320-623.

Microsoft Corporation, "Interrupt Architecture Enhancements in Microsoft Windows, Codenamed "Longhorn"", Windows Platform Design Notes, © 2003 Microsoft Corporation, 42 pp.

PCI Special Interest Group, PCI Local Bus Specification Rev. 2.3: PCI Engineering Change Notice—MSI-X, Jun. 10, 2003, 23 pp.

PCI Special Interest Group, PCI-SIG 2004; web pages including Mar. 20, 2002 news release "PCI-SIG Releases New PCI Version 2.3 Local Bus Specification for Migration to Low-Voltage Designs," 18 pp. Available from the Internet at <URL: http://www.pcisig.com>.

PCT International Preliminary Examination Report, Jan. 18, 2007, for International Application No. PCT/US2005/022361.

Penokie, G.O. (Ed.), "Information Technology—SCSI Controller Commands-2 (SCC-2)", T10/Project 1225D, Revision 4, Sep. 12, 1997, 24 pp.

Rangarajan, M., A. Bohra, K. Banerjee, E.V. Carrera, and R. Bianchini, "TCP Servers: Offloading TCP Processing in Internet Servers. Design, Implementation, and Performance", Technical Report, Rutgers University, 2002, pp. 1-14.

RDMA Consortium, "Architectural Specifications for RDMA over TCP/IP", [online], 2005, [retrieved on Dec. 22, 2005], retrieved from the Internet at <URL: http://www.rdmaconsortium.org/home>.

Recio, R., P. Culley, D. Garcia, & J. Hilland, "An RDMA Protocol Specification (Version 1.0)," Release Specification of the RDMA Consortium, Oct. 2002, 60 pp.

Salzmann, T., and M. Peppel, "GTO Driving Protection Technique with Status Monitoring", IEEE Transactions on Industry Applications, vol. 24, Issue 1, Part 1, 1998, pp. 115-120. [Abstract].

Shah, H., J. Pinkerton, R. Recio, & P. Culley, "Direct Data Placement over Reliable Transports (Version 1.0)," Release Specification of the RDMA Consortium, Oct. 2002, 35 pp.

Shanley, T. and D. Anderson, (Eds.), "PCI System Architecture," 4th ed.; TOC pp. v-xlii; Intro. pp. 1-6; Chapter 1 pp. 7-13; Chapter 2 pp. 15-21; 1999.

Stevens, R.W., "UNIX Network Programming", 1990, pp. 209-210.

"Virtual Interface Architecture Specification", Draft Revision 1.0, Dec. 4, 1997, 83 pp.

Wangdee, W. and R Billinton, "Utilization of Time Varying Event-based Customer Interruption Cost Load Shedding Schemes", 2004 International Conference on Probabilistic Methods Applied to Power Systems, Sep. 2004, pp. 769-775. [Abstract].

Weber, R., M. Rajagopal, F. Travostino, M. O'Donnell, C. Monia, and M. Merhar, "Fibre Channel (FC) Frame Encapsulation", Network Working Group Request for Comments 3643 (RFC 3643), Dec. 2003, pp. 1-20.

Webopedia, "Write-back Cache", [online], [Retrieved on Jul. 2, 2004], Retrieved from the Internet at <URL: http://www.webopedia.com/TERM/w/write_back_cache.html>, 2 pp.

US Final Office Action, Feb. 26, 2007, for U.S. Appl. No. 10/882,557, 14 pp.

US First Office Action, Oct. 23, 2006, for U.S. Appl. No. 10/882,557, 13 pp.

Office Action, dated Feb. 26, 2008, for German Patent Application No. 11 2005 001 430.4-53, 3 pp.

Office Action, dated Feb. 26, 2008, for German Patent Application No. 11 2005 001 430.4-53, 3 pp. [English Translation].

Thies, K., "80486 Systemsoftware-Entwicklung", Carl Hanser Verlag Munchen Wien, May 27, 1992, 6 pp.

Thies, K., "80486 Systemsoftware-Entwicklung", English Translation of Tables from pp. 123 and 126, May 27, 1992, 1 pg.

Final Office Action, Aug. 16, 2009, for U.S. Appl. No. 11/015,680, 28 pp.

Office Action 1, Mar. 17, 2009, for U.S. Appl. No. 11/015,680, 26 pp.

Office Action 2, Aug. 17, 2009, for Patent Application No. DE112005001430.4-53, 3 pp.

Office Action 2, Aug. 17, 2009, for Patent Application No. DE112005001430.4-53, 3 pp. [Translation].

Official Letter, Aug. 17, 2006, for Patent Application No. TW94121396, 2 pp.

Official Letter, Aug. 17, 2006, for Patent Application No. TW94121396, 1 pp. [Translation].

Thies, K., "80486 Systemsoftware-Entwicklung [System Software Development]", Carl Hanser Verlag Munchen Wien, May 27, 1992, pp. 172, 277, 278, & 287, 14 pp. [includes English Translation].

Thies, K., "80486 Systemsoftware-Entwicklung [System Software Development]", Carl Hanser Verlag Munchen Wien, May 27, 1992, pp. 123 through 126, 15 pp. [includes English Translation].

* cited by examiner

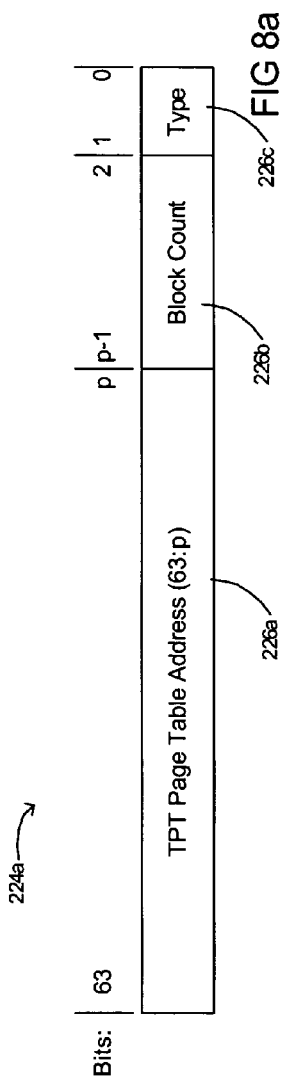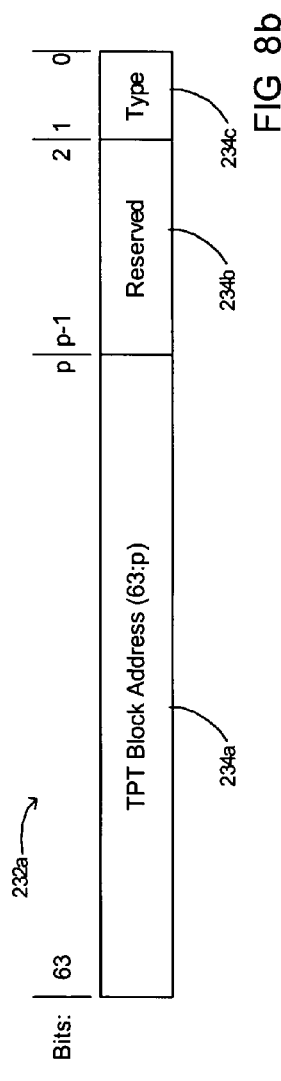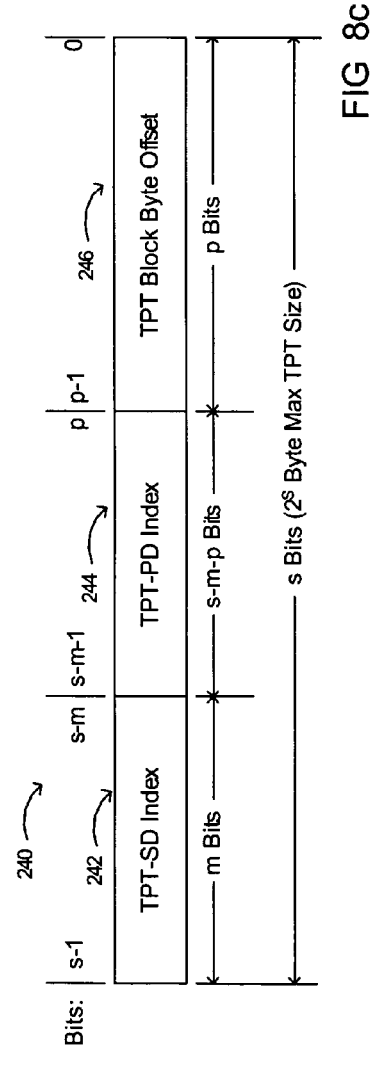

METHOD, SYSTEM, AND PROGRAM FOR UTILIZING A VIRTUALIZED DATA STRUCTURE TABLE

BACKGROUND

1. Related Cases

METHOD, SYSTEM, AND PROGRAM FOR MANAGING MEMORY FOR DATA TRANSMISSION THROUGH A NETWORK, Ser. No. 10/683,941, filed Oct. 9, 2003; METHOD, SYSTEM, AND PROGRAM FOR MANAGING VIRTUAL MEMORY, Ser. No. 10/747,920, filed Dec. 29, 2003; METHOD, SYSTEM, AND PROGRAM FOR CACHING A VIRTUALIZED DATA STRUCTURE TABLE, Ser. No. 10/882,557, filed Jun. 30, 2004; and MESSAGE CONTEXT BASED TCP TRANSMISSION, Ser. No. 10/809,077, filed Mar. 24, 2004.

2. Description of Related Art

In a network environment, a network adapter on a host computer, such as an Ethernet controller, Fibre Channel controller, etc., will receive Input/Output (I/O) requests or responses to I/O requests initiated from the host computer.

Often, the host computer operating system includes a device driver to communicate with the network adapter hardware to manage I/O requests to transmit over a network. The host computer may also employ a protocol which packages data to be transmitted over the network into packets, each of which contains a destination address as well as a portion of the data to be transmitted. Data packets received at the network adapter are often stored in a packet buffer. A transport protocol layer can process the packets received by the network adapter that are stored in the packet buffer, and access any I/O commands or data embedded in the packet.

For instance, the computer may employ the TCP/IP (Transmission Control Protocol Internet Protocol) (to encode and address data for transmission, and to decode and access the payload data in the TCP/IP packets received at the network adapter. IP specifies the format of packets, also called datagrams, and the addressing scheme. TCP is a higher level protocol which establishes a connection between a destination and a source and provides a byte-stream, reliable, full-duplex transport service. Another protocol, Remote Direct Memory Access (RDMA) on top of TCP provides, among other operations, direct placement of data at a specified memory location at the destination.

A device driver, application or operating system can utilize significant host processor resources to handle network transmission requests to the network adapter. One technique to reduce the load on the host processor is the use of a TCP/IP Offload Engine (TOE) in which TCP/IP protocol related operations are embodied in the network adapter hardware as opposed to the device driver or other host software, thereby saving the host processor from having to perform some or all of the TCP/IP protocol related operations. Similarly, an RDMA-enabled NIC (RNIC) offloads RDMA and transport related operations from the host processor(s).

Offload engines and other devices frequently utilize memory, often referred to as a buffer, to store or process data. Buffers have been embodied using physical memory which stores data, usually on a short term basis, in integrated circuits, an example of which is a random access memory or RAM. Typically, data can be accessed relatively quickly from such physical memories. Also, a buffer is usually arranged as a set of physically contiguous memory locations, that is, memory locations having contiguous physical addresses. A host computer often has additional physical memory such as hard disks and optical disks to store data on a longer term basis. These nonintegrated circuit based physical memories tend to retrieve data more slowly than the integrated circuit physical memories.

The operating system of a computer typically utilizes a virtual memory space which is often much larger than the memory space of the physical memory of the computer. FIG. 1 shows an example of a virtual memory space 50 and a short term physical memory space 52. The memory space of a long term physical memory such as a hard drive is indicated at 54. The data to be sent in a data stream or the data received from a data stream may initially be stored in noncontiguous portions, that is, nonsequential memory addresses, of the various memory devices. For example, two portions indicated at 10a and 10b may be stored in the physical memory in noncontiguous portions of the short term physical memory space 52 while another portion indicated at 10c may be stored in a long term physical memory space provided by a hard drive as shown in FIG. 1. The operating system of the computer uses the virtual memory address space 50 to keep track of the actual locations of the portions 10a, 10b and 10c of the datastream 10. Thus, a portion 50a of the virtual memory address space 50 is mapped to the actual physical memory addresses of the physical memory space 52 in which the data portion 10a is stored. In a similar fashion, a portion 50b of the virtual memory address space 50 is mapped to the actual physical memory addresses of the physical memory space 52 in which the data portion 10b is stored. The datastream 10 frequently resides in contiguous virtual memory address space while mapped into noncontiguous physical memory space). Furthermore, a portion 50c of the virtual memory address space 50 is mapped to the physical memory addresses of the long term hard drive memory space 54 in which the data portion 10c is stored. A blank portion 50d represents an unassigned or unmapped portion of the virtual memory address space 50.

FIG. 2 shows an example of a typical system translation and protection table (TPT) 60 which the operating system utilizes to map virtual memory addresses to real physical memory addresses with protection at the process level. Thus, the virtual memory address of the virtual memory space 50a may start at virtual memory address 0X1000, for example, which is mapped to a physical memory address 8AEF000, for example of the physical memory space 52. The system TPT table 60 does not have any physical memory addresses which correspond to the virtual memory addresses of the virtual memory address space 50d because the virtual memory space 50d has not yet been mapped to physical memory space.

In known systems, portions of the virtual memory space 50 may be assigned to a device or software module for use by that module so as to provide memory space for buffers. Also, in some known designs, an Input/Output (I/O) device such as a network adapter or a storage controller may have the capability of directly placing data into an application buffer or other, memory area. Such a direct data placement capability can reduce or eliminate intermediate buffering in which data is placed in a temporary buffer prior to being transferred to the intended memory location of the system. A Remote Direct Memory Access (RDMA) enabled Network Interface Card (RNIC) is an example of an I/O device which can perform direct data placement. An RNIC can support defined operations (also referred to as "semantics") including RDMA Write, RDMA Read and Send/Receive, for memory to memory data transfers across a network.

The address of the application buffer which is the destination of the RDMA operation is frequently carried in the RDMA packets in some form of a buffer identifier and a virtual address or offset. The buffer identifier identifies which buffer the data is to be written to or read from. The virtual address or offset carried by the packets identifies the location within the identified buffer for the specified direct memory operation.

In order to perform direct data placement, an I/O device typically maintains its own translation and protection table (TPT), an example of which is shown at 70 in FIG. 3. The device TPT 70 contains data structures 72a, 72b, 72c . . . 72n, each of which is used to control access to a particular buffer as identified by an associated buffer identifier of the buffer identifiers 74a, 74b, 74c . . . 74n. The device TPT 70 further contains data structures 76a, 76b, 76c . . . 76n, each of which is used to translate the buffer identifier and virtual address or offset into physical memory addresses of the particular buffer identified by the associated buffer identifier 74a, 74b, 74c . . . 74n. Thus, for example, the data structure 76a of the TPT 70 is used by the I/O device to perform address translation for the buffer identified by the identifier 74a. Similarly, the data structure 72a is used by the I/O device to perform protection checks for the buffer identified by the buffer identifier 74a. The address translation and protection checks may be performed prior to direct data placement of the payload contained in a packet received from the network or prior to sending the data out on the network.

In order to facilitate high-speed data transfer, a device TPT such as the TPT 70 is typically managed by the I/O device and the driver software for the device. A device TPT can occupy a relatively large amount of memory. As a consequence, a device TPT is frequently resident in system memory. The I/O device may maintain a cache of a portion of the device TPT to reduce access delays.

Notwithstanding, there is a continued need in the art to improve the performance of memory usage in data transmission and other operations.

BRIEF DESCRIPTION OF THE DRAWINGS

Referring now to the drawings in which like reference numbers represent corresponding parts throughout:

FIGS. 8a and 8b illustrate embodiments of data structures for the mapping tables of FIG. 6;

FIG. 8c illustrates an embodiment of a virtual address for addressing the virtualized data structure table of FIG. 6;

DETAILED DESCRIPTION OF THE ILLUSTRATED EMBODIMENTS

In the following description, reference is made to the accompanying drawings which form a part hereof and which illustrate several embodiments of the present disclosure. It is understood that other embodiments may be utilized and structural and operational changes may be made without departing from the scope of the present description.

Figures 1, 2:
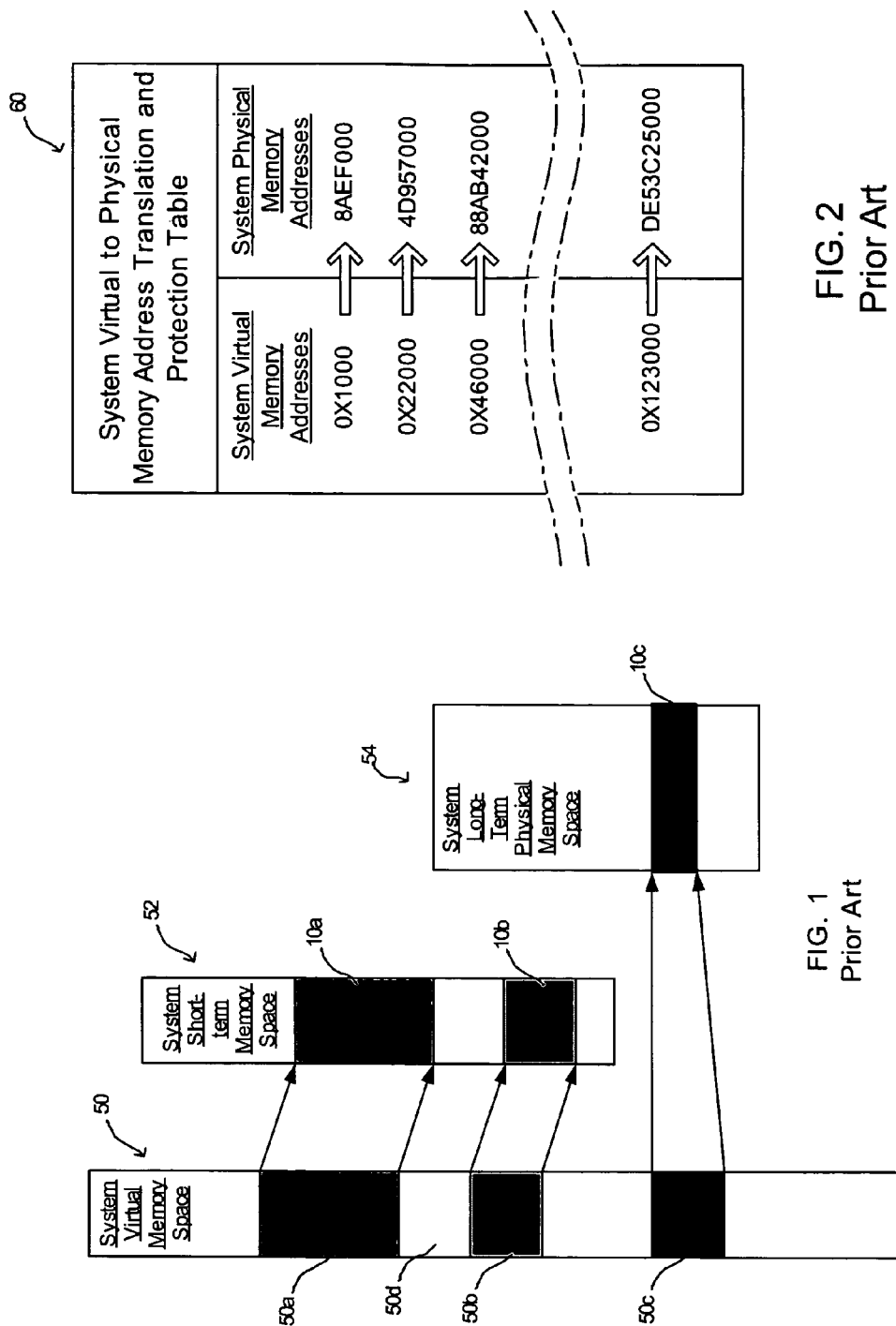
FIG. 1 illustrates prior art virtual and physical memory addresses of a system memory in a computer system.
FIG. 2 illustrates a prior art system virtual to physical memory address translation and protection table.
Figure 3:
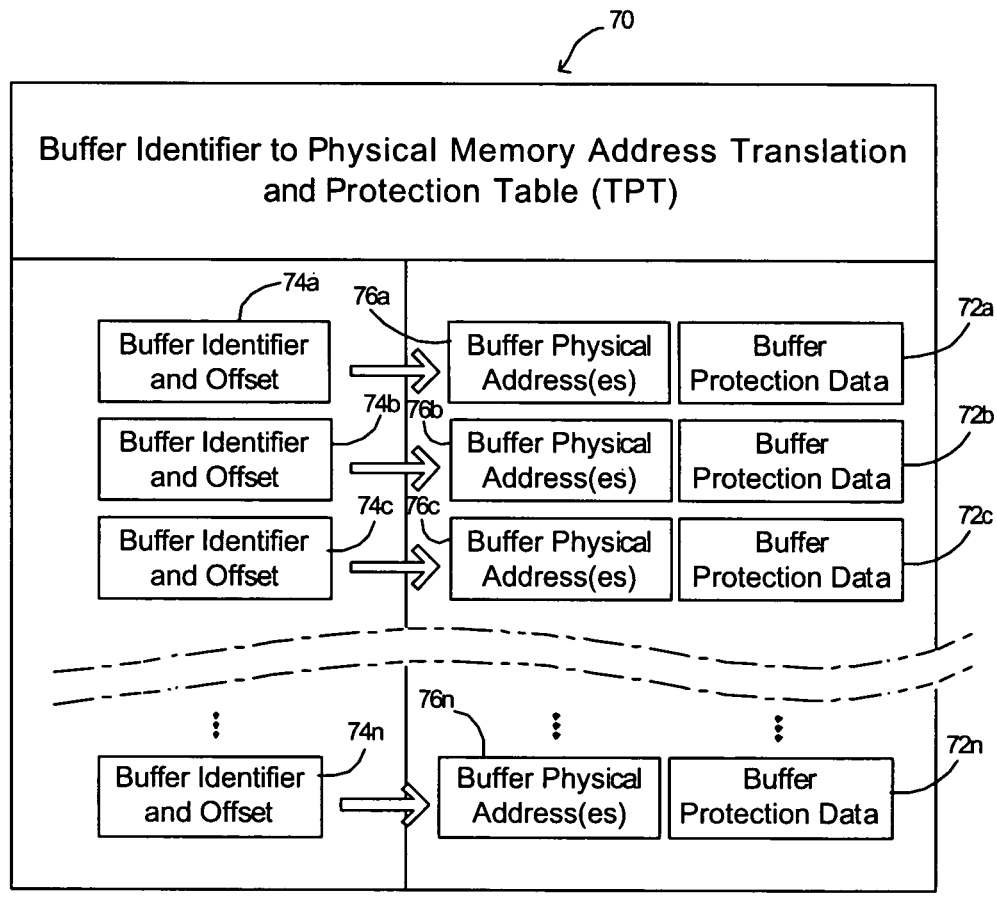
FIG. 3 illustrates a prior art translation and protection table for an I/O device.
Figure 4:
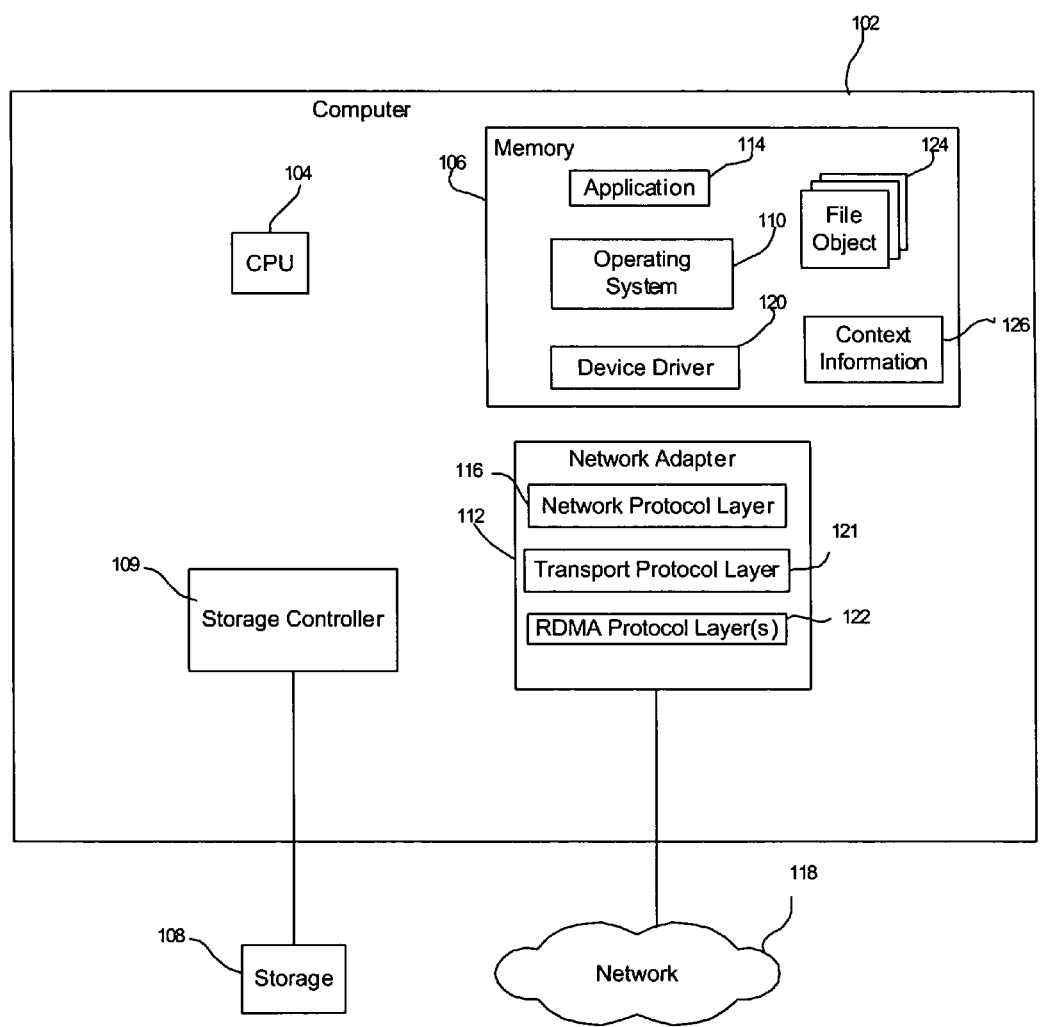
FIG. 4 illustrates one embodiment of a computing environment in which aspects of the description provided herein are embodied.

FIG. 4 illustrates a computing environment in which aspects of described embodiments may be embodied. A computer 102 includes one or more central processing units (CPU) 104 (only one is shown), a memory 106, non-volatile storage 108, a storage controller 109, an operating system 110, and a network adapter 112. An application 114 executes on a CPU 104, resides in memory 106 and is capable of transmitting and receiving packets from a remote computer. The content residing in memory 106 may be cached in accordance with known caching techniques. The computer 102 may comprise any computing device known in the art, such as a mainframe, server, personal computer, workstation, laptop, handheld computer, telephony device, network appliance, virtualization device, storage controller, storage controller, etc. Any CPU 104 and operating system 110 known in the art may be used. Programs and data in memory 106 may be swapped into storage 108 as part of memory management operations.

The storage controller 109 controls the reading of data from and the writing of data to the storage 108 in accordance with a storage protocol layer. The storage protocol of the layer may be any of a number of known storage protocols including Redundant Array of Independent Disks (RAID), High Speed Serialized Advanced Technology Attachment (SATA), parallel Small Computer System Interface (SCSI), serial attached SCSI, etc. Data being written to or read from the storage 108 may be cached in accordance with known caching techniques. The storage controller may be integrated into the CPU chipset, which can include various controllers including a system controller, peripheral controller, memory controller, hub controller, I/O bus controller, etc.

The network adapter 112 includes a network protocol layer 116 to send and receive network packets to and from remote devices over a network 118. The network 118 may comprise a Local Area Network (LAN), the Internet, a Wide Area Network (WAN), Storage Area Network (SAN), etc. Embodiments may be configured to transmit data over a wireless network or connection, such as wireless LAN, Bluetooth, etc. In certain embodiments, the network adapter 112 and various protocol layers may employ the Ethernet protocol over unshielded twisted pair cable, token ring protocol, Fibre Channel protocol, Infiniband, etc., or any other network communication protocol known in the art. The network adapter controller may be integrated into the CPU chipset, which, as noted above, can include various controllers including a system controller, peripheral controller, memory controller, hub controller, I/O bus controller, etc.

A device driver 120 executes on a CPU 104, resides in memory 106 and includes network adapter 112 specific commands to communicate with a network controller of the network adapter 112 and interface between the operating system 110, applications 114 and the network adapter 112. The network controller can embody the network protocol layer 116 and can control other protocol layers including a data link layer and a physical layer which includes hardware such as a data transceiver.

In certain embodiments, the network controller of the network adapter 112 includes a transport protocol layer 121 as well as the network protocol layer 116. For example, the network controller of the network adapter 112 can employ a TCP/IP offload engine (TOE), in which many transport layer operations can be performed within the network adapter 112 hardware or firmware, as opposed to the device driver 120 or host software.

The transport protocol operations include packaging data in a TCP/IP packet with a checksum and other information and sending the packets. These sending operations are performed by an agent which may be embodied with a TOE, a network interface card or integrated circuit, a driver, TCP/IP stack, a host processor or a combination of these elements. The transport protocol operations also include receiving a TCP/IP packet from over the network and unpacking the TCP/IP packet to access the payload data. These receiving operations are performed by an agent which, again, may be embodied with a TOE, a driver, a host processor or a combination of these elements.

The network layer 116 handles network communication and provides received TCP/IP packets to the transport protocol layer 121. The transport protocol layer 121 interfaces with the device driver 120 or operating system 110 or an application 114, and performs additional transport protocol layer operations, such as processing the content of messages included in the packets received at the network adapter 112 that are wrapped in a transport layer, such as TCP, the Internet Small Computer System Interface (iSCSI), Fibre Channel SCSI, parallel SCSI transport, or any transport layer protocol known in the art. The TOE of the transport protocol layer 121 can unpack the payload from the received TCP/IP packet and transfer the data to the device driver 120, an application 114 or the operating system 110.

In certain embodiments, the network controller and network adapter 112 can further include RDMA protocol layer(s) 122 as well as the transport protocol layer 121. For example, the network adapter 112 can employ an RDMA offload engine, in which RDMA layer operations are performed within the network adapter 112 hardware or firmware, as opposed to the device driver 120 or other host software.

Thus, for example, an application 114 transmitting messages over an RDMA connection can transmit the message through the device driver 120 and the RDMA protocol layer(s) 122 of the network adapter 112. The data of the message can be sent to the transport protocol layer 121 to be packaged in a TCP/IP packet before transmitting it over the network 118 through the network protocol layer 116 and other protocol layers including the data link and physical protocol layers.

The memory 106 further includes file objects 124, which also may be referred to as socket objects, which include information on a connection to a remote computer over the network 118. The application 114 uses the information in the file object 124 to identify the connection. The application 114 may use the file object 124 to communicate with a remote system. The file object 124 may indicate the local port or socket that will be used to communicate with a remote system, a local network (IP) address of the computer 102 in which the application 114 executes, how much data has been sent and received by the application 114, and the remote port and network address, e.g., IP address, with which the application 114 communicates. Context information 126 comprises a data structure including information the device driver 120, operating system 110 or an application 114, maintains to manage requests sent to the network adapter 112 as described below.

In the illustrated embodiment, the CPU 104 programmed to operate by the software of memory 106 including one or more of the operating system 110, applications 114, and device drivers 120 provides a host which interacts with the network adapter 112. Accordingly, a data send and receive agent 132 includes the transport protocol layer 121 and the network protocol layer 116 of the network interface 112. However, the data send and receive agent may be embodied with a TOE, a network interface card or integrated circuit, a driver, TCP/IP stack, a host processor or a combination of these elements.

Figure 5:
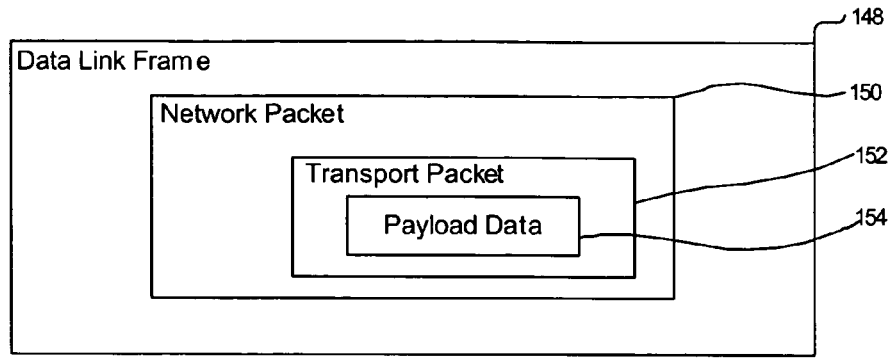
FIG. 5 illustrates a prior art packet architecture.

FIG. 5 illustrates a format of a network packet 150 received at or transmitted by the network adapter 112. The data link frame 148 is embodied in a format understood by the data link layer, such as 802.11 Ethernet. Details on this Ethernet protocol are described in "IEEE std. 802.11," published 1999-2003. An Ethernet frame may include additional Ethernet components, such as a header and an error checking code (not shown). The data link frame 148 includes a network packet 150, such as an IP datagram. The network packet 150 is embodied in a format understood by the network protocol layer 116, such as such as the IP protocol. A transport packet 152 is included in the network packet 150. The transport packet 152 is capable of being processed by the transport protocol layer 121, such as the TCP. The packet may be processed by other layers in accordance with other protocols including Internet Small Computer System Interface (iSCSI) protocol, Fibre Channel SCSI, parallel SCSI transport, etc. The transport packet 152 includes payload data 154 as well as other transport layer fields, such as a header and an error checking code. The payload data 152 includes the underlying content being transmitted, e.g., commands, status and/or data. The driver 120, operating system 110 or an application 114 may include a layer, such as a SCSI driver or layer, to process the content of the payload data 154 and access any status, commands and/or data therein. Details on the Ethernet protocol are described in "IEEE std. 802.3," published Mar. 8, 2002.

In accordance with one aspect of the description provided herein, an I/O device has a virtualized data structure table such as an address translation and protection table (TPT), for example, which has virtually contiguous data structures but not necessarily physically contiguous data structures in system memory. As explained in greater detail below, such an arrangement can facilitate memory operations in a variety of applications.

Figure 6:
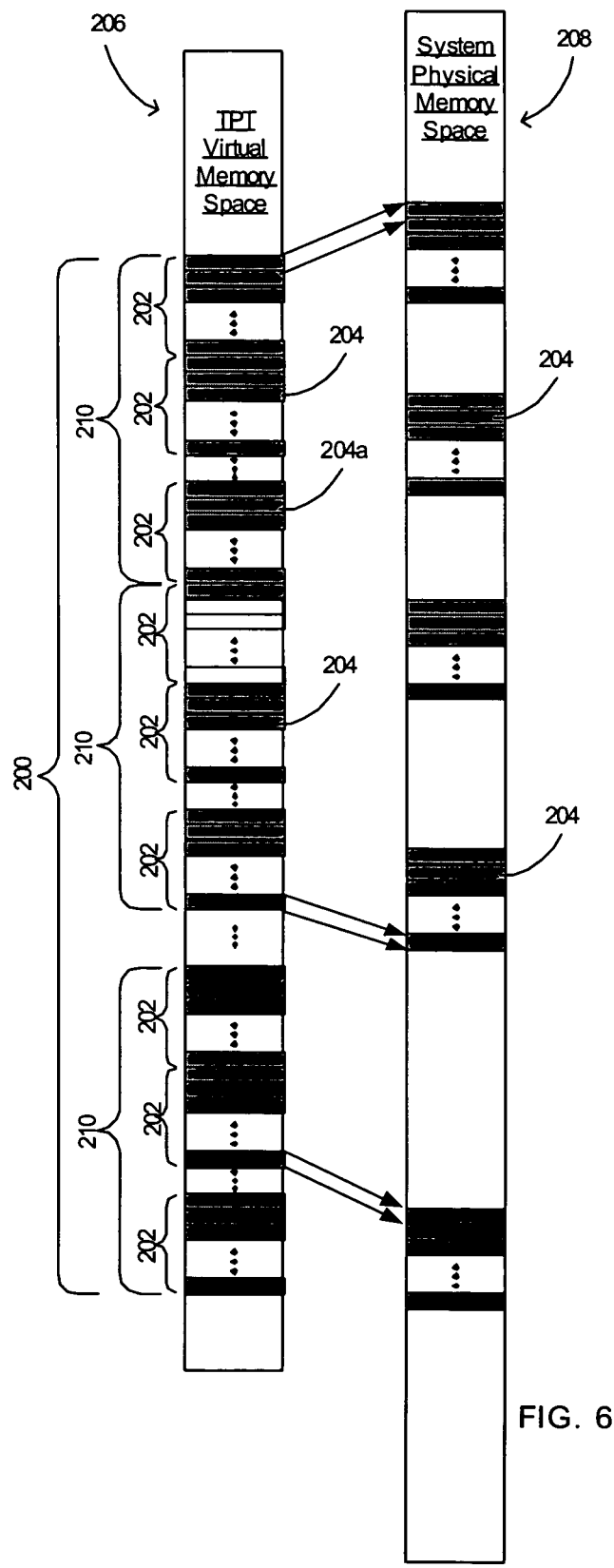
FIG. 6 illustrates one embodiment of a virtualized data structure table for an I/O device in accordance with aspects of the description.

FIG. 6 shows an example of a virtualized TPT table 200 having virtually contiguous pages or blocks 202 of TPT entries 204, each TPT entry containing one or more data structures. The TPT entry blocks 202 are contiguous to each other in a TPT virtual address space 206 but may be disjointed, that is, not contiguous to each other in the system physical memory space 208 in which the TPT entry blocks 202 reside. However, in the illustrated embodiment, the TPT entries 204 of each block 202 of entries may be contiguous, that is, have contiguous system memory addresses in the system physical memory space 208 in which the TPT entry blocks 202 reside.

In accordance with another aspect of the description provided herein, the TPT 200 may be accessed in a virtually contiguous manner. The virtual address space for TPT may be per I/O device and it can be disjoint from the virtual address space used by the applications, the operating system, the drivers and other I/O devices. In the illustrated embodiment, the TPT 200 is subdivided at a first hierarchal level into a plurality of virtually contiguous units or segments 210. Each unit or segment 210 is in turn subdivided at a second hierarchal level into a plurality of physically contiguous subunits or subsegments 202. The subsegments 202 are referred to herein as "pages" or "blocks" 202. Each page or block 202 is in turn subdivided at a third hierarchal level into a plurality of virtually contiguous TPT entries 204. Each TPT entry 204 contains one or more data structures stored in one or more bytes of memory. It is appreciated that the TPT 200 may be subdivided at a greater number or lesser number of hierarchal levels.

In the illustrated embodiment, each of the segments 210 of the TPT 200 is of equal size, each of the pages 202 of the TPT 200 is of equal size and each of the TPT entries 204 is of equal size. However, it is appreciated that TPT segments of unequal sizes, TPT pages of unequal sizes and TPT entries of unequal sizes may also be utilized.

Figure 7:
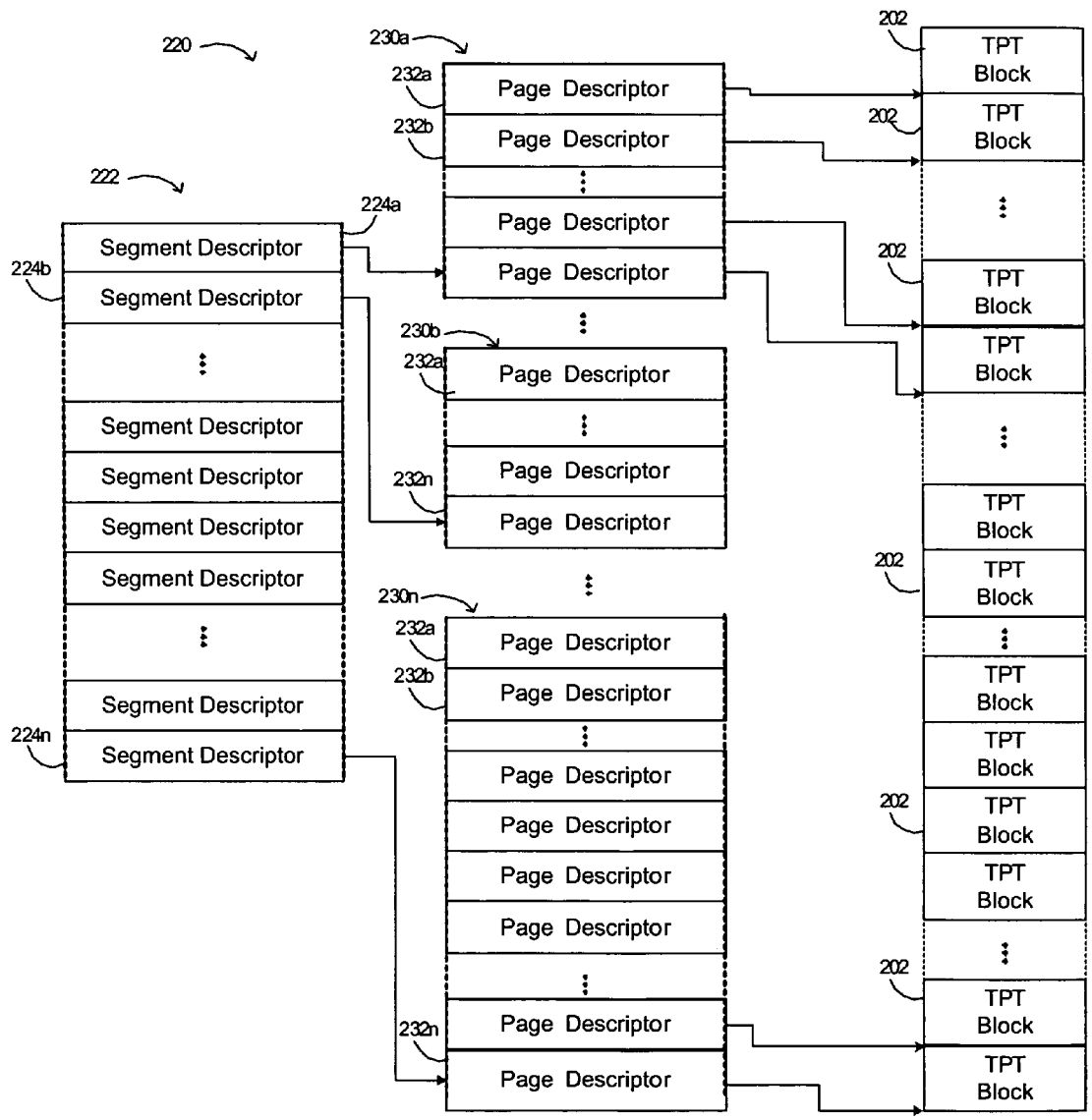
FIG. 7 illustrates one embodiment of mapping tables for accessing the virtualized data structure table of FIG. 6.

In the illustrated embodiment, the TPT 200 may be accessed in a virtually contiguous manner utilizing a set of hierarchal data structure tables 220 shown schematically in FIG. 7. A first hierarchal level data structure table 222, referred to herein as a segment descriptor table 222, has a plurality of segment descriptor entries 224a, 224b . . . 224n. Each segment descriptor entry 224a, 224b . . . 224n contains data structures, an example of which is shown in FIG. 8a at 224a. In this example, each of the segment descriptor entries 224a, 224b . . . 224n contains a plurality of data structures 226a, 226b and 226c which define characteristics of one of the segments 210 of the TPT 200. More particularly, each of the segment descriptor entries 224a, 224b . . . 224n describe a second level hierarchal data structure table referred to herein as a page descriptor table. Each page descriptor table is one of a plurality of page descriptor tables 230a, 230b . . . 230n (FIG. 7).

Each page descriptor table 230a, 230b . . . 230n has a plurality of page descriptor entries 232a, 232b . . . 232n. Each page descriptor entry 232a, 232b . . . 232n contains data structures, an example of which is shown in FIG. 8b at 232a. In this example, each of the page descriptor entries 232a, 232b . . . 232n contains a plurality of data structures 234a, 234b and 234c which define characteristics of one of the pages or blocks 202 of a segment 210 of the TPT 200.

In the illustrated embodiment, if the number of TPT entries 204 in the TPT table 200 is represented by the variable $2^S$, the TPT entries 204 may be accessed in a virtually contiguous manner utilizing a virtual address comprising s address bits as shown at 240 in FIG. 8c, for example. If the number of segments 210 into which the TPT table 200 is subdivided is represented by the variable $2^m$, each segment 210 can describe up to $2^{(s-m)}$ bytes of the TPT virtual memory space 206.

In the illustrated embodiment, the segment descriptor table 222 may reside in memory located within the I/O device. Also, a set of bits indicated at 242 of the virtual address 240 may be utilized to define an index, referred to herein as a TPT segment descriptor index, to identify a particular segment descriptor entry 224a, 224b . . . 224n of the segment descriptor table 222. In the illustrated embodiment, the m most significant bits of the s bits of the TPT virtual address 240 may be used to define the TPT segment descriptor index. It is appreciated that the segment descriptor table 222 may alternatively reside in whole or in part in other memory.

Figure 9:
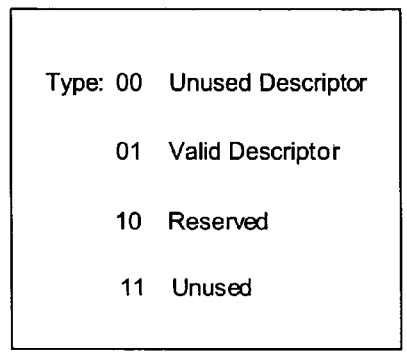
FIG. 9 illustrates an example of values for a data structure for the mapping tables of FIG. 6.

Once identified by the TPT segment descriptor index 242 of the TPT virtual address 240, the data structure 226a (FIG. 8a) of the identified segment descriptor entry 224a, 224b . . . 224n, can provide the physical address of one of the plurality of page descriptor tables 230a, 230b . . . 230n (FIG. 7). A second data structure 226b of the identified segment descriptor entry 224a, 224b . . . 224n can specify how large the page descriptor table of data structure 226a is by, for example, providing a block count. A third data structure 226c of the identified segment descriptor entry 224a, 224b . . . 224n can provide additional information concerning the segment 210 such as whether the particular segment 210 is being used or is valid, as set forth in the type table of FIG. 9.

Also, a second set of bits indicated at 244 of the virtual address 240 may be utilized to define a second index, referred to herein as a TPT page descriptor index, to identify a particular page descriptor entry 232a, 232b . . . 232n of the page descriptor table 232a, 232b . . . 232n identified by the physical address of the data structure 226a (FIG. 8a) of the segment descriptor entry 224a, 224b . . . 224n identified by the TPT segment descriptor index 242 of the TPT virtual address 240. In the illustrated embodiment, the next s-m-p most significant bits of the s bits of the TPT virtual address 240 may be used to define the TPT segment descriptor index 244.

Once identified by the physical address contained in the data structure 226a of the TPT segment descriptor table entry identified by the TPT segment descriptor index 242 of the TPT virtual address 240, and the TPT page descriptor index 244 of the TPT virtual address 240, the data structure 234a (FIG. 8b) of the identified page descriptor entry 232a, 232b . . . 232n, can provide the physical address of one of the plurality of TPT pages or blocks 202 (FIG. 7). A second data structure 226b of the identified page descriptor entry 232a, 232b . . . 232n may be reserved. A third data structure 234c of the identified page descriptor entry 232a, 232b . . . 232n can provide additional information concerning the TPT block or page 202 such as whether the particular TPT block or page 202 is being used or is valid, as set forth in the type table of FIG. 9.

Also, a third set of bits indicated at 246 of the virtual address 240 may be utilized to define a third index, referred to herein as a TPT block byte offset, to identify a particular TPT entry 204 of the TPT page or block 202 identified by the physical address of the data structure 234a (FIG. 8b) of the page descriptor entry 232a, 232b . . . 232n identified by the TPT page descriptor index 244 of the TPT virtual address 240. In the illustrated embodiment, the p least significant bits of the s bits of the TPT virtual address 240 may be used to define the TPT block byte offset 246 to identify a particular byte of $2^P$ bytes in a page or block 202 of bytes.

Figures 10, 12:
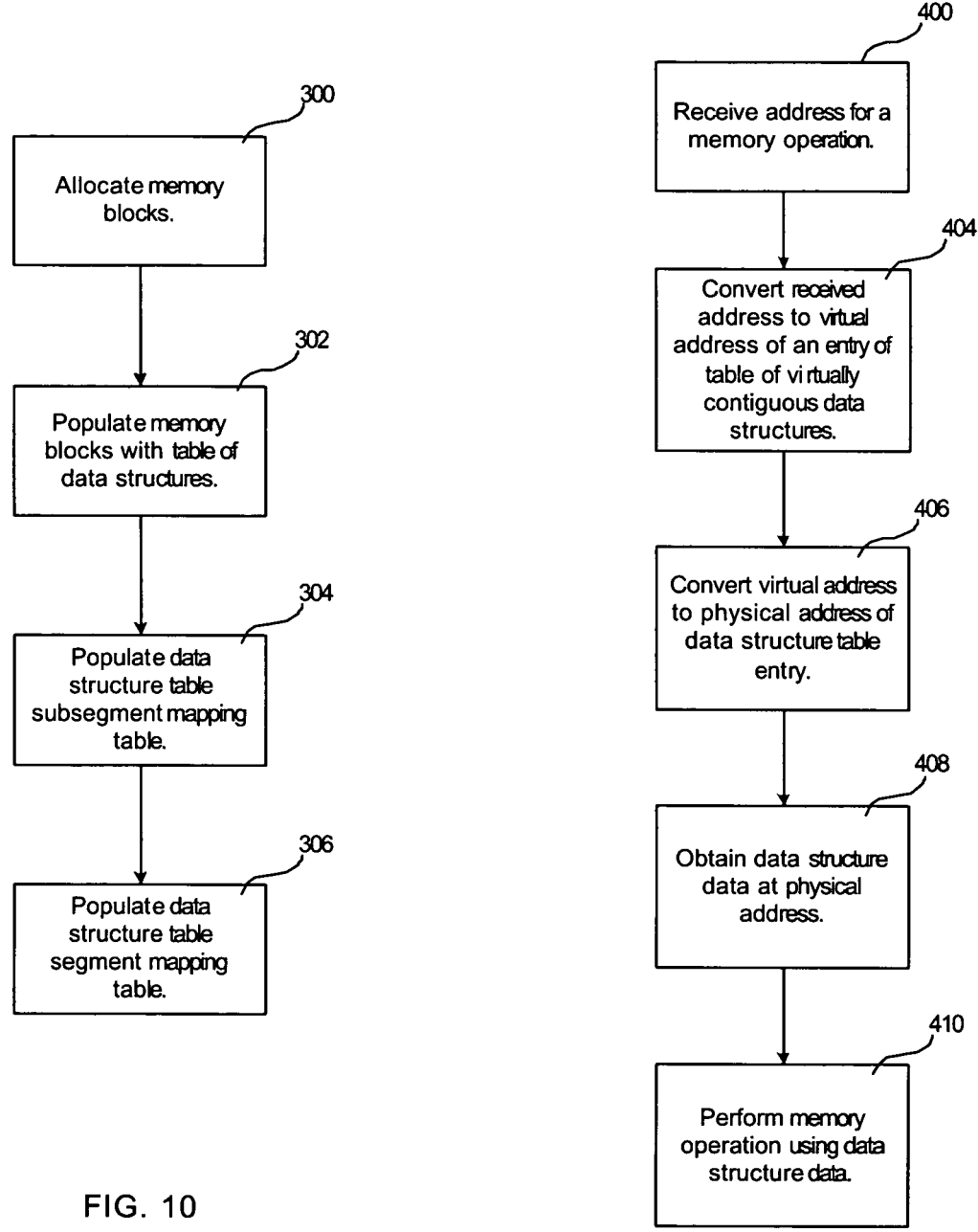
FIG. 10 illustrates one embodiment of operations performed to populate the virtualized data structure table of FIG. 6 and the mapping tables of FIG. 7.
FIG. 12 illustrates one embodiment of operations performed to convert a received address and to obtain data structures from the virtualized data structure table of FIG. 6.

FIG. 10 shows an example of operations of a device driver 120 for an I/O device such as the adapter 112, to initialize a data structure table such as the TPT 200. The device driver 120 allocates (block 300) memory blocks to construct the TPT 200. The size and number of the allocated memory blocks, as well as the size and number of the segments 110 in which the data structure table will be subdivided, will be a function of the operating system 110, the computer system 102 and the needs of the I/O device.

Figure 11:
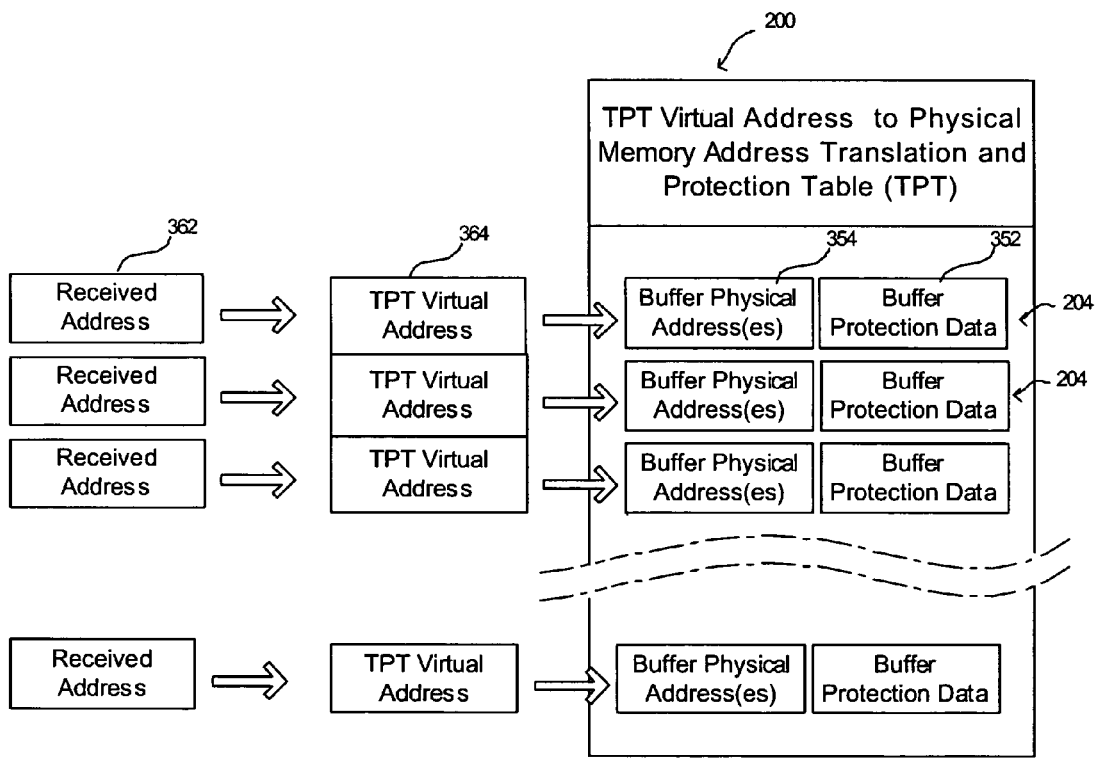
FIG. 11 is a schematic representation of one embodiment of operations performed to convert a received address and to obtain data structures from the virtualized data structure table of FIG. 6.

Once allocated and pinned, the memory blocks may be populated (block 302) with data structure entries such as the TPT entries 204. As shown in FIG. 11, each TPT entry 204 of the TPT 200 may include a data structure 352 which contains buffer protection data for a particular buffer, and a data structure 354 which contains the physical address of the particular buffer. In the illustrated embodiment, the bytes of the TPT entries 204 within each allocated memory block may be physically contiguous although the TPT blocks or pages 202 of TPT entries 204 of the TPT 200 may be disjointed or noncontiguous. In one embodiment, the TPT blocks or pages 202 of TPT entries 204 of the TPT 200 are each located at $2^P$ physical address boundaries where each TPT block or page 202 comprises $2^P$ contiguous bytes. Also, in one embodiment, where the system memory has 64 bit addresses, for example, each TPT entry will be 8-byte aligned. It is appreciated that other boundaries and other addressing schemes may be used as well.

Also, the data structure table subsegment mapping tables such as the page descriptor tables 230a, 230b . . . 230n (FIG. 7), may be populated (block 304, FIG. 10) with data structure entries such as the page descriptor entries 232a, 232b . . . 232n. As previously mentioned, each page descriptor entry may include a data structure such as the data structure 234a (FIG. 8b) which contains the physical address of a TPT page or block 202 of TPT entries 204 of the TPT 200, as well as a data structure such as the data structure 234c which contains type information fir the page or block 202.

The page descriptor tables 230a, 230b . . . 230n (FIG. 7) may be resident either in memory such as the system memory 106 or on the I/O device. If the page descriptor tables 230a, 230b . . . 230n are resident on the I/O device, the I/O address of the page descriptor tables 230a, 230b . . . 230n may be mapped by the device driver 120 and then the page descriptor tables 230a, 230b . . . 230n may be initialized by the device driver 120. If the page descriptor tables 230a, 230b . . . 230n are resident in the system memory 106, they can be addressed using system physical addresses, for example.

In an alternative embodiment, the page descriptor tables 230a, 230b . . . 230n can be stored in the TPT 200 itself in a virtually contiguous region of the TPT 200. In this embodiment, the base TPT virtual address of the page descriptor tables 230a, 230b . . . 230n may be initialized by the device driver 120 and communicated to the I/O device such as the adapter 112. The I/O device can then use this base address to access the page descriptor tables 230a, 230b . . . 230n.

Also, the data structure table segment mapping table such as the segment descriptor table 222 (FIG. 7), may be populated (block 306, FIG. 10) with data structure entries such as the segment descriptor entries 224a, 224b . . . 224n. As previously mentioned, each segment descriptor entry may include a data structure such as the data structure 226a (FIG. 8a) which contains the physical address of one of the page descriptor table 230a, 230b . . . 230n. Each segment descriptor entry may further include a data structure 226b which describes the size of the page descriptor table, as well as a data structure such as the data structure 224c which contains type information for the page descriptor table.

The I/O device may use a data structure table virtual address to access the various data structures in the data structure table, to perform various functions such as address translation and protection checks. For example, the I/O device can use the TPT virtual address 240 of FIG. 8c to obtain the physical address of the TPT entry 204 for a particular buffer, in which the data structures of that TPT entry 204 contain the physical address and protection check information for that buffer.

FIG. 12 shows an example of operations of an I/O device receiving (block 402) an address 362 (FIG. 11) for a memory operation. The received address is converted (block 404) to a virtual address 364 (FIG. 11) of an entry of a table of virtually contiguous data structures, such as an entry 204 of the TPT 200, for example. The I/O device converts (block 406) the virtual address 364 to a physical address of the data structure entry. Using the physical address, the data of the data structure may be obtained (block 408) to perform (block 410) the requested memory operation.

Figure 13:
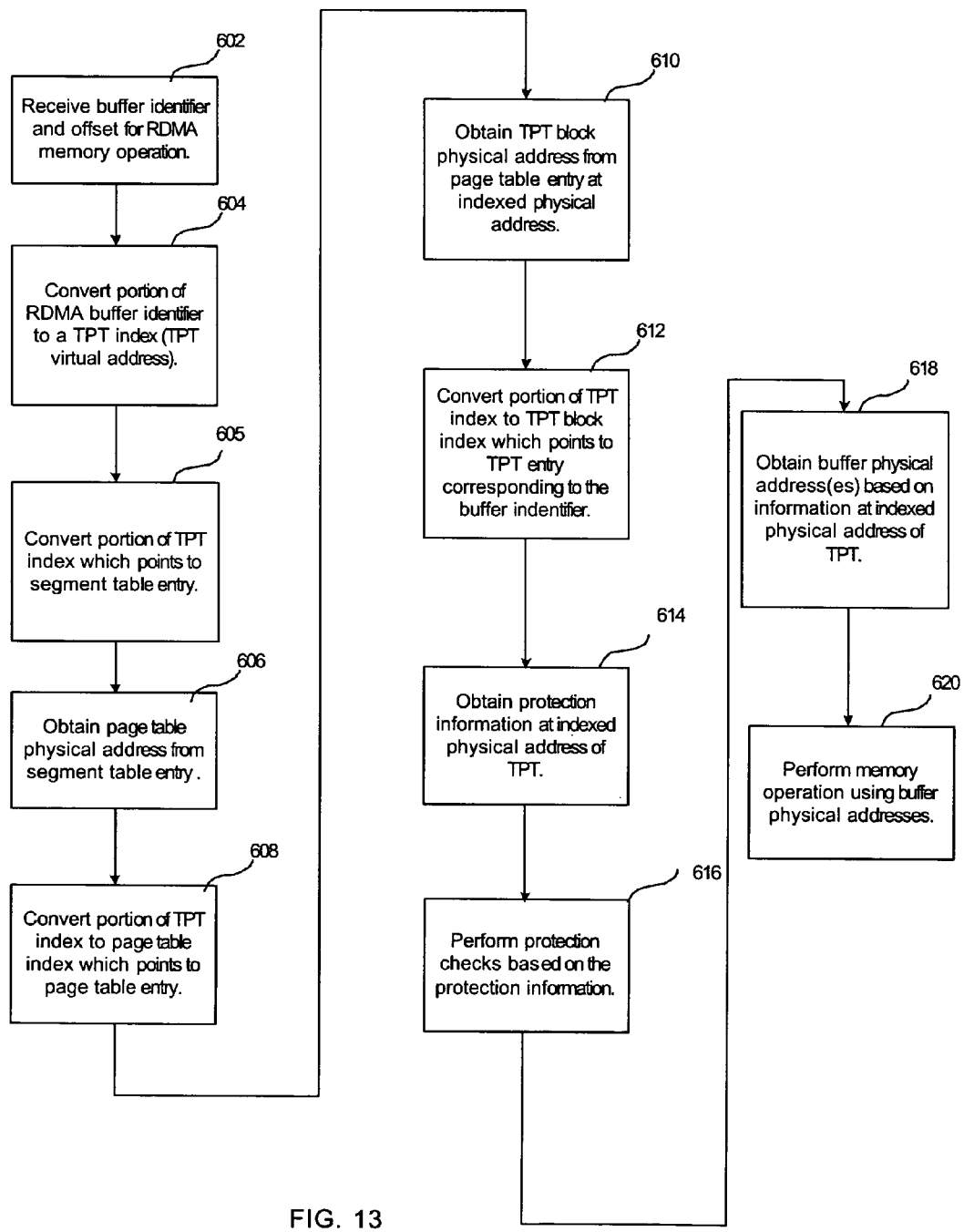
FIG. 13 is a more detailed illustration of one embodiment of operations performed to convert a received RDMA address and to obtain data structures from the virtualized data structure table of FIG. 6.

FIG. 13 shows a more detailed example of an I/O device receiving an address for a memory operation. In this example, an RDMA enabled network adapter 112 receives (block 602) an RDMA operation having a memory destination address in the form of a buffer identifier and an offset (virtual address or zero-based offset) within that buffer. A portion of the received buffer identifier is converted (block 604) to a TPT index, which in the illustrated embodiment, is a TPT virtual address such as the TPT virtual address 240 of FIG. 8c. A portion of the TPT index is converted (block 605) to a segment table index such as the TPT segment descriptor index 242 of FIG. 8c. The adapter 112 obtains (block 606) the physical address of a page table such as one of the page descriptor tables 230a, 230b . . . 230n (FIG. 7) using the segment table index generated above to identify a particular entry of a segment table such as a segment descriptor table 220 and read the data structures 226a-226c of that identified segment table entry 224a, 224b . . . 224n. A portion of the TPT index is converted (block 608) to a page table index such as the TPT page descriptor index 244 of FIG. 8c. The adapter 112 obtains (block 610) the physical address of a page or block of TPT entries, such as one of the TPT blocks 202, using the page table index generated above to identify a particular entry of a page table such as a page descriptor table 230a and reads the data structures 234a, 234c of that identified page descriptor table entry 232a, 232b . . . 232n. A portion of the TPT index is converted (block 612) to a TPT block index or offset such as the TPT block byte offset 246 of FIG. 8c. The TPT block index points to the TPT entry which corresponds to the buffer identifier. The adapter 112 obtains (block 614) the protection data of a buffer using the TPT block index or offset generated above to identify a particular entry 204 of the identified TPT block 202 and reads the data structures 352, 354 of that identified TPT entry 204. The protection check may be performed (block 616) based on the obtained protection information. If the protection check fails, the operation is aborted and the remaining processes (blocks 618, 620) are not performed. If the protection check passes, the buffer physical address(es) may be obtained (block 618) based on information at the indexed physical address of the TPT entry including the offset, size of the memory operation and the address translation information. The requested RDMA memory operation may then be performed (block 620) at the identified buffer using the obtained buffer physical address(es)

Figure 14:
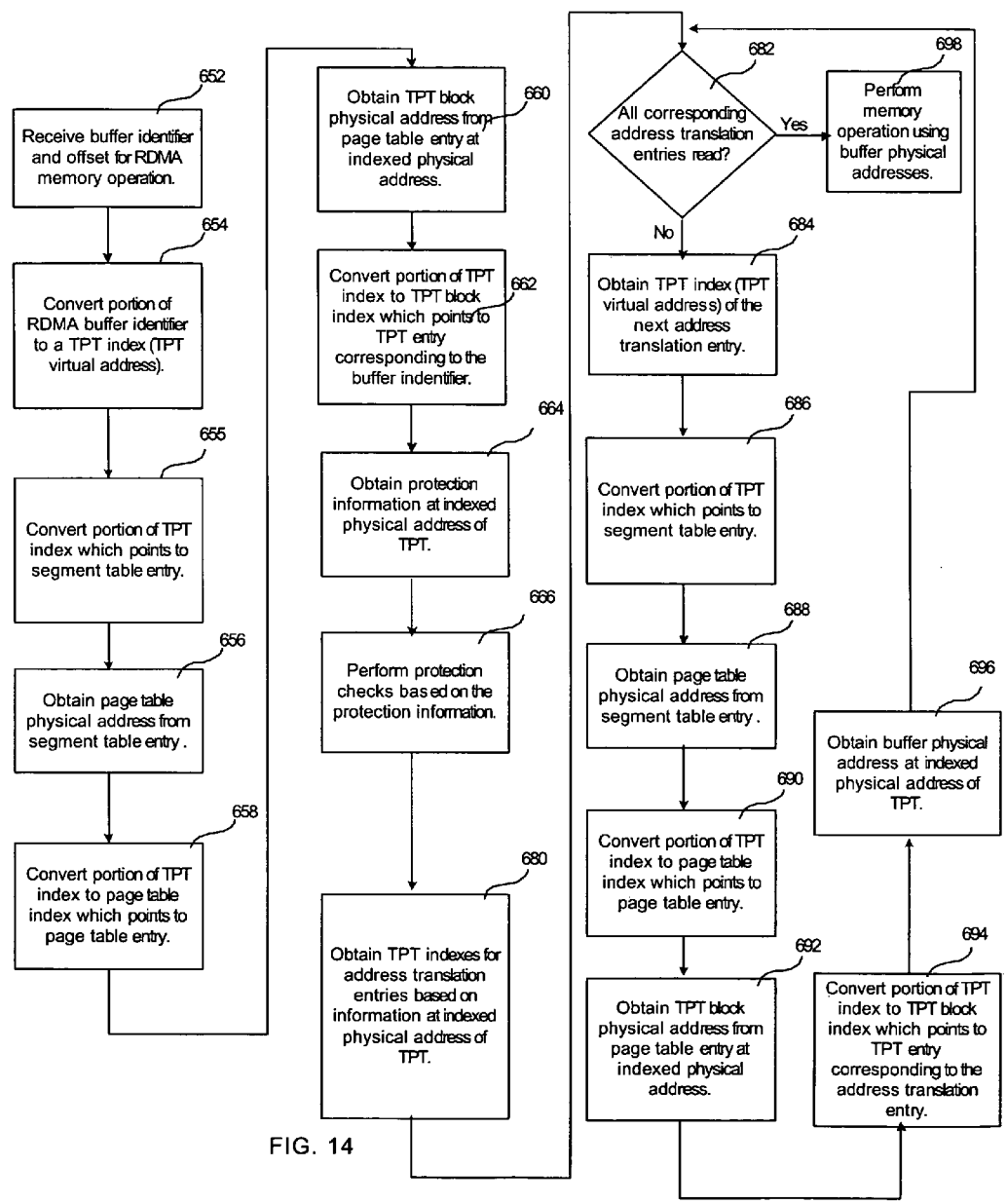
FIG. 14 is another detailed illustration of one embodiment of operations performed to convert a received RDMA address and to obtain data structures from the virtualized data structure table of FIG. 6

FIG. 14 shows another detailed example of an I/O device receiving an address for a memory operation. In this example, the operations of blocks 652-666 are similar to those of the operations of blocks 602-616 of FIG. 13. Thus, in the operation of block 666, a protection check may be performed based on the obtained protection information. If the protection check fails, the operation is aborted and the remaining processes (blocks 680-698) are not performed. However, if the protection check (block 666) passes, another level of operation is provided in which a plurality of buffer physical addresses may be obtained. More specifically, a plurality of TPT indexes or virtual addresses may be obtained (block 680) for address translation entries based on, for example, the offset, size of memory operation, and the address translation information. The indices of TPT entries may be obtained at the indexed physical address of the TPT at which the physical protection data was obtained. The information about the indices may be stored as a base TPT index and the number of TPT indices corresponding to the buffer.

A determination (block 682) as to whether all of the corresponding address translation entries have been read. If not, the TPT index (or TPT virtual address) of the next address translation entry is obtained (block 684). A portion of the TPT index is converted (block 686) to a segment table index such as the TPT segment descriptor index 242 of FIG. 8c.

The adapter 112 obtains (block 688) the physical address of a page table such as one of the page descriptor tables 230a, 230b . . . 230n (FIG. 7) using the segment table index generated above to identify a particular entry of a segment table such as a segment descriptor table 220 and read the data structures 226a-226c of that identified segment table entry 224a, 224b . . . 224n.

A portion of the TPT index is converted (block 690) to a page table index such as the TPT page descriptor index 244 of FIG. 8c. The adapter 112 obtains (block 692) the physical address of a page or block of TPT entries, such as one of the TPT blocks 202, using the page table index generated above to identify a particular entry of a page table such as a page descriptor table 230a and reads the data structures 234a, 234c of that identified page descriptor table entry 232a, 232b . . . 232n.

A portion of the TPT index is converted (block 694) to a TPT block index or offset such as the TPT block byte offset 246 of FIG. 8c. The TPT block index points to the TPT entry corresponding to the address translation entry. The adapter 112 obtains (block 696) the buffer physical address using the TPT block index or offset generated above to identify a particular entry 204 of the identified TPT block 202 and reads the data structures 352, 354 of that identified TPT entry 204. In this manner, an obtained TPT index is translated to the physical address of a buffer.

Again, a determination is made (block 682) as to whether all of the corresponding address translation entries have been read. If not, the operations of blocks 684-696 are repeated. Once all of the corresponding address translation entries have been read, the memory operation may be performed (block 698) using all of the buffer physical addresses translated from the obtained TPT indexes or virtual addresses.

Additional Embodiment Details

The described techniques for managing memory may be embodied as a method, apparatus or article of manufacture using standard programming and/or engineering techniques to produce software, firmware, hardware, or any combination thereof. The term "article of manufacture" as used herein refers to code or logic embodied in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are embodied may further be accessible through a transmission media or from a file server over a network. In such cases, the article of manufacture in which the code is embodied may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present disclosure, and that the article of manufacture may comprise any information bearing medium known in the art.

In the described embodiments, certain operations were described as being performed by the operating system 110, system host 130, device driver 120, or the network interface 112. In alternative embodiments, operations described as performed by one of these may be performed by one or more of the operating system 110, device driver 120, or the network interface 112. For example, memory operations described as being performed by the driver may be performed by the host.

In the described embodiments, a transport protocol layer 121 and RDMA protocol layer(s) 132 were embodied in the network adapter 112 hardware. In alternative embodiments, one or more of these protocol layers may be embodied in the device driver or host memory 106.

In certain embodiments, the device driver and network adapter embodiments may be included in a computer system including a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. In alternative embodiments, the network adapter embodiments may be included in a system that does not include a storage controller, such as certain hubs and switches.

In certain embodiments, the device driver and network adapter embodiments may be embodied in a computer system including a video controller to render information to display on a monitor coupled to the computer system including the device driver and network adapter, such as a computer system comprising a desktop, workstation, server, mainframe, laptop, handheld computer, etc. Alternatively, the network adapter and device driver embodiments may be embodied in a computing device that does not include a video controller, such as a switch, router, etc.

In certain embodiments, the network adapter may be configured to transmit data across a cable connected to a port on the network adapter. Alternatively, the network adapter embodiments may be configured to transmit data over a wireless network or connection, such as wireless LAN, Bluetooth, etc.

The illustrated logic of FIGS. 10-14 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Figure 15:
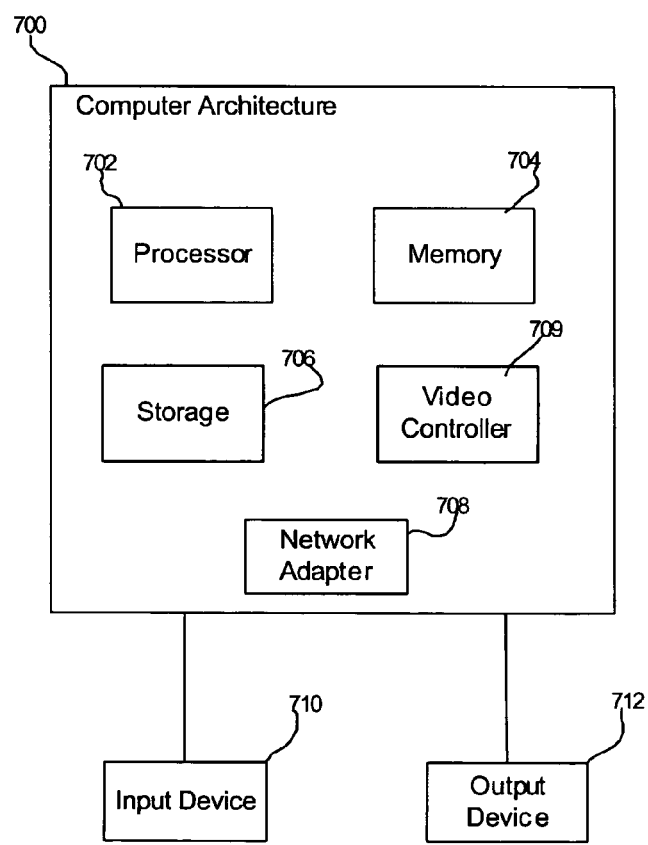
FIG. 15 illustrates an architecture that may be used with the described embodiments.

FIG. 15 illustrates one embodiment of a computer architecture 700 of the network components, such as the hosts and storage devices shown in FIG. 4. The architecture 700 may include a processor 702 (e.g., a microprocessor), a memory 704 (e.g., a volatile memory device), and storage 706 (e.g., a non-volatile storage, such as magnetic disk drives, optical disk drives, a tape drive, etc.). The processor 702 may be mounted on a motherboard, for example. The storage 706 may comprise an internal storage device or an attached or network accessible storage. Programs in the storage 706 are loaded into the memory 704 and executed by the processor 702 in a manner known in the art. The architecture further includes a network adapter 708 to enable communication with a network, such as an Ethernet, a Fibre Channel Arbitrated Loop, etc. Further, the architecture may, in certain embodiments, include a video controller 709 to render information on a display monitor, where the video controller 709 may be embodied on a video card or integrated on integrated circuit components mounted on the motherboard. As discussed, certain of the network devices may have multiple network cards or controllers. An input device 710 is used to provide user input to the processor 702, and may include a keyboard, mouse, pen-stylus, microphone, touch sensitive display screen, or any other activation or input mechanism known in the art. An output device 712 is capable of rendering information transmitted from the processor 702, or other component, such as a display monitor, printer, storage, etc.

The network adapter 708 may be mounted on an expansion card, such as a Peripheral Component Interconnect (PCI) card, PCI-express or some other I/O expansion card coupled to a motherboard, or on integrated circuit components mounted on the motherboard. Details on the PCI architecture are described in "PCI Local Bus, Rev. 2.3", published by the PCI-SIG. Details on the Fibre Channel architecture are described in the technology specification "Fibre Channel Framing and Signaling Interface", document no. ISO/IEC AWI 14165-25. Details on the TCP protocol are described in "Internet Engineering Task Force (IETF) Request for Comments (RFC) 793," published September 1981, details on the IP protocol are described in "Internet Engineering Task Force Request for Comments (RFC) 791, published September 1981, and details on the RDMA protocol are described in the technology specification "Architectural Specifications for RDMA over TCP/IP" Version 1.0 (October 2003).

The foregoing description of various embodiments has been presented for the purposes of illustration and description. It is not intended to be exhaustive or to limit to the precise form disclosed. Many modifications and variations are possible in light of the above teaching.

What is claimed is:

1. A method, comprising:
receiving a memory operation address for a memory operation;
converting said received address to a first virtual address of a first indexed physical address within a translation and protection table of virtually contiguous data structures wherein said translation and protection table contains at said first indexed physical address, protection data and a second virtual address of a second indexed physical address within said translation and protection table wherein said translation and protection table contains at said second indexed physical address a physical address of a buffer and wherein said translation and protection table is subdivided into a plurality of segments and wherein said first virtual address includes a first plurality of segment descriptor table index bits which identify a first segment descriptor table entry of a segment descriptor table of contiguous segment descriptors and wherein said second virtual address is different from said first virtual address, and said second indexed physical address is different from said first indexed physical address;
converting said first virtual address to said first indexed physical address wherein said first virtual address converting includes obtaining a first subsegment descriptor table physical address at said first segment descriptor table entry of said segment descriptor table identified by said first plurality of segment descriptor table index bits, wherein said first subsegment descriptor table physical address is a physical address of a subsegment descriptor table of contiguous subsegment descriptors;
obtaining said protection data at said first indexed physical address of said translation and protection table;
performing said memory operation including protection checking using said protection data obtained at said first indexed physical address;
obtaining said second virtual address at said first indexed physical address of said translation and protection table wherein said second virtual address includes a second plurality of segment descriptor table index bits which identify a second segment descriptor table entry of said segment descriptor table of contiguous segment descriptors and wherein second plurality of segment descriptor table index bits is different from said first plurality of segment descriptor table index bits, said second segment descriptor table entry is different from said first segment descriptor table entry;
converting said second virtual address to said second indexed physical address wherein said second virtual address converting includes obtaining a second subsegment descriptor table physical address at said second segment descriptor table entry of said segment descriptor table identified by said second plurality of segment descriptor table index bits; and
obtaining said buffer physical address at said second indexed physical address of said translation and protection table;
and wherein said memory operation performing further includes transferring data at said buffer at said buffer physical address obtained at said second indexed physical address.

2. The method of claim 1 wherein said translation and protection table contains at said second indexed physical address a plurality of physical addresses of a buffer and said memory operation performing further includes transferring data at said buffer physical addresses.

3. The method of claim 1 wherein said memory operation address includes a buffer identifier and at least one of a virtual address and offset within a buffer.

4. The method of claim 1 wherein each segment is subdivided into a plurality of subsegments and each subsegment is subdivided in to a plurality of contiguous data structure entries and wherein each subsegment descriptor includes a physical address of a subsegment of contiguous data structure entries of said translation and protection table.

5. The method of claim 4 wherein said first virtual address further includes a plurality of subsegment descriptor table index bits which identify a subsegment descriptor entry of a subsegment descriptor table of subsegment descriptors of the plurality of subsegment descriptor tables.

6. The method of claim 5 wherein said first virtual address further includes a plurality of data structure table index bits which identify a data structure entry of said subsegment of contiguous data structure entries.

7. The method of claim 6 wherein said receiving includes receiving a destination address for a Remote Direct Memory Access (RDMA) memory operation; said received address converting includes converting a portion of said RDMA destination address to segment descriptor table index bits which point to a segment descriptor table entry.

8. The method of claim 7 wherein said first virtual address converting includes obtaining a subsegment descriptor table physical address at said segment descriptor table entry pointed to by said segment descriptor table index bits.

9. The method of claim 8 wherein said received address converting includes converting a portion of said RDMA destination address to subsegment descriptor table index bits which point to a subsegment descriptor table entry; and said first virtual address converting includes obtaining said first indexed physical address at said subsegment descriptor table entry of a subsegment descriptor table of the plurality of subsegment descriptor tables, at said obtained subsegment descriptor table physical address and pointed to by said subsegment descriptor table index bits.

10. The method of claim 9 wherein said received address converting includes converting a portion of said RDMA destination address to data structure table index bits which point to a data structure table entry of a subsegment of contiguous data structure entries; and said virtual address converting includes obtaining a plurality of buffer physical addresses at said data structure table entry of said data structure table at said obtained data structure table entry physical address and pointed to by said data structure table index bits.

11. The method of claim 6 wherein the identified data structure entry of said subsegment of contiguous data structure entries contains a data structure which contains a plurality of index bits of said second virtual address which identify a segment descriptor entry of said segment descriptor table of contiguous segment descriptors.

12. The method of claim 11 wherein said second virtual address further includes a plurality of subsegment descriptor table index bits which identify a subsegment descriptor entry of a table of subsegment descriptors.

13. The method of claim 12 wherein said second virtual address further includes a plurality of data structure table index bits which identify a data structure entry of a subsegment of contiguous data structure entries, which contains a plurality of physical addresses of a buffer and said memory operation performing further includes transferring data at said buffer physical addresses.

14. An article comprising a non-transitory tangible storage medium, the storage medium comprising machine readable instructions stored thereon to:
receive a memory operation address for a memory operation;
convert said received address to a first indexed physical address within a translation and protection table of virtually contiguous data structures wherein said translation and protection table contains at said first indexed physical address, protection data and a second virtual address of a second indexed physical address within said translation and protection table wherein said translation and protection table contains at said second indexed physical address a physical address of a buffer and wherein said translation and protection table is subdivided into a plurality of segments and wherein said first virtual address includes a first plurality of segment descriptor table index bits which identify a first segment descriptor table entry of a table of contiguous segment descriptors and wherein said second virtual address is different from said first virtual address and said second indexed physical address is different from said first indexed physical address;
convert said first virtual address to said first indexed physical address of said first data structure table entry wherein said first virtual address converting includes obtaining a first subsegment descriptor table physical address at said first segment descriptor table entry of said segment descriptor table identified by said first plurality of segment descriptor table index bits, wherein said first subsegment descriptor table physical address is a physical address of a subsegment descriptor table of contiguous subsegment descriptors;
obtaining said protection data at said first indexed physical address of said translation and protection table;
perform said memory operation including protection checking using said protection data obtained from said first at least one data structure;
obtain said second virtual address at said first indexed physical address of said translation and protection table from said first at least one data structure wherein said second virtual address includes a second plurality of segment descriptor table index bits which identify a second segment descriptor table entry of said segment descriptor table of contiguous segment descriptors and wherein second plurality of segment descriptor table index bits is different from said first plurality of segment descriptor table index bits, said second segment descriptor table entry is different from said first segment descriptor table entry;
convert said second virtual address to said second indexed physical address wherein said second virtual address converting includes obtaining a second subsegment descriptor table physical address at said second segment descriptor table entry of said segment descriptor table identified by said second plurality of segment descriptor table index bits; and
obtaining said buffer physical address at said second indexed physical address of said translation and protection table;
wherein said memory operation performing further includes transferring data at said buffer at said buffer physical address obtained at said second indexed physical address.

15. The article of claim 14 wherein said translation and protection table contains at said second indexed physical address a plurality of physical addresses of a buffer and said memory operation performing includes transferring data at said buffer physical addresses.

16. The article of claim 14 wherein said memory operation address includes a buffer identifier and at least one of a virtual address and offset within a buffer.

17. The article of claim 14 wherein each segment is subdivided into a plurality of subsegments and each subsegment is subdivided in to a plurality of contiguous data structure entries and wherein each subsegment descriptor includes a physical address of a subsegment of contiguous data structure entries of said translation and protection table.

18. The article of claim 17 wherein said first virtual address further includes a plurality of subsegment descriptor table index bits which identify a subsegment descriptor entry of a subsegment descriptor table of subsegment descriptors of the plurality of subsegment descriptor tables.

19. The article of claim 18 wherein said first virtual address further includes a plurality of data structure table index bits which identify a data structure entry of said subsegment of contiguous data structure entries.

20. The article of claim 19 wherein said receiving includes receiving a destination address for a Remote Direct Memory Access (RDMA) memory operation; said received address converting includes converting a portion of said RDMA destination address to segment descriptor table index bits which point to a segment descriptor table entry.

21. The article of claim 20 wherein said first virtual address converting includes obtaining a subsegment descriptor table physical address at said segment descriptor table entry pointed to by said segment descriptor table index bits.

22. The article of claim 21 wherein said received address converting includes converting a portion of said RDMA destination address to subsegment descriptor table index bits which point to a subsegment descriptor table entry; and said first virtual address converting includes obtaining said first indexed physical address at said subsegment descriptor table entry of a subsegment descriptor table of the plurality of subsegment descriptor tables, at said obtained subsegment descriptor table physical address and pointed to by said subsegment descriptor table index bits.

23. The article of claim 22 wherein said received address converting includes converting a portion of said RDMA destination address to data structure table index bits which point to a data structure table entry of a subsegment of contiguous data structure entries; and said virtual address converting includes obtaining a plurality of buffer physical addresses at said data structure table entry of said data structure table at said obtained data structure table entry physical address and pointed to by said data structure table index bits.

24. The article of claim 19 wherein the identified data structure entry of said subsegment of contiguous data structure entries contains a data structure which contains a plurality of index bits of said second virtual address which identify a segment descriptor entry of said segment descriptor table of contiguous segment descriptors.

25. The article of claim 24 wherein said second virtual address further includes a plurality of subsegment descriptor table index bits which identify a subsegment descriptor entry of a table of subsegment descriptors.

26. The article of claim 25 wherein said second virtual address further includes a plurality of data structure table index bits which identify a data structure entry of a subsegment of contiguous data structure entries, which contains a plurality of physical addresses of a buffer and said memory operation performing includes transferring data at said buffer physical addresses.

27. A system for use with a network, comprising:
at least one system memory which includes an operating system;
a motherboard;
a processor mounted on the motherboard and coupled to the memory;
an expansion card coupled to said motherboard;
a network adapter mounted on said expansion card;
and a device driver executable by the processor in the system memory for said network adapter wherein the device driver is adapted to store in said system memory a translation and protection table of virtually contiguous data structures and wherein said translation and protection table is subdivided into a plurality of segments and each segment is subdivided into a plurality of subsegments and each subsegment is subdivided in to a plurality of contiguous data structure entries of said translation and protection table and wherein said driver is adapted to store in said system memory a plurality of subsegment descriptor tables, each subsegment descriptor table being a subsegment descriptor table of contiguous subsegment descriptors, each subsegment descriptor including a physical address of a subsegment of contiguous data structure entries of said translation and protection table and to store in said adapter a segment descriptor table of contiguous segment descriptors, each segment descriptor including a physical address of a subsegment descriptor table of contiguous subsegment descriptors of the plurality of subsegment descriptor tables; and wherein the network adapter is adapted to:
receive a memory operation address for a memory operation;
convert said received address to a first virtual address of a first indexed physical address within said translation and protection table of virtually contiguous data structures wherein said translation and protection table contains at said first indexed physical address, protection data and a second virtual address a second indexed physical address within said translation and protection table wherein said translation and protection table contains at said second indexed physical address a physical address of a buffer and wherein said first virtual address includes a first plurality of segment descriptor table index bits which identify a first segment descriptor table entry of said segment descriptor table of contiguous segment descriptors, each segment descriptor including a physical address of a subsegment descriptor table of contiguous subsegment descriptors of the plurality of subsegment descriptor tables and wherein said second virtual address is different from said first virtual address, and said second indexed physical address is different from said first physical address;
convert said first virtual address to said first indexed physical address of said first translation and protection table entry wherein said first virtual address converting includes obtaining a first subsegment descriptor table physical address at said first segment descriptor table entry of said segment descriptor table identified by said first plurality of segment descriptor table index bits;
obtaining said protection data at said first said physical address of said translation and protection table;
perform said memory operation including protection checking using said protection data obtained at said first indexed physical address;
obtain said second virtual address at said first indexed physical address of said translation and protection table wherein said second virtual address includes a second plurality of segment descriptor table index bits which identify a second segment descriptor table entry of said segment descriptor table of contiguous segment descriptors and wherein second plurality of segment descriptor table index bits is different from said first plurality of segment descriptor table index bits, said second segment descriptor table entry is different from said first segment descriptor table entry;
convert said second virtual address to said second indexed physical address wherein said second virtual address converting includes obtaining a second subsegment descriptor table physical address at said second segment descriptor table entry of said segment descriptor table identified by said second plurality of segment descriptor table index bits; and
obtaining said buffer physical address said second indexed physical address of said translation and protection table;
wherein said memory operation performing further includes transferring data at said buffer at said buffer physical address obtained at said second indexed physical address.

28. The system of claim 27 wherein said system memory includes a buffer and said translation and protection table contains at said second indexed physical address a plurality of physical addresses of a buffer and said memory operation performing includes transferring data at said buffer physical addresses.

29. The system of claim 27 wherein said address includes a buffer identifier and at least one of a virtual address and offset within a buffer.

30. The system of claim 27 wherein said first virtual address further includes a plurality of subsegment descriptor table index bits which identify a subsegment descriptor entry of a subsegment descriptor table of subsegment descriptors of the plurality of subsegment descriptor tables.

31. The system of claim 30 wherein said first virtual address further includes a plurality of data structure table index bits which identify a data structure entry of said subsegment of contiguous data structure entries.

32. The system of claim 31 wherein said receiving includes receiving a destination address for a Remote Direct Memory Access (RDMA) memory operation; said received address converting includes converting a portion of said RDMA destination address to segment descriptor table index bits which point to a segment descriptor table entry.

33. The system of claim 32 wherein said first virtual address converting includes obtaining a subsegment descriptor table physical address at said segment descriptor table entry pointed to by said segment descriptor table index bits.

34. The system of claim 33 wherein said received address converting includes converting a portion of said RDMA destination address to subsegment descriptor table index bits which point to a subsegment descriptor table entry; and said virtual address converting includes obtaining said first indexed physical address at said subsegment descriptor table entry of a subsegment descriptor table at said obtained subsegment descriptor table physical address and pointed to by said subsegment descriptor table index bits.

35. The system of claim 34 wherein said received address converting includes converting a portion of said RDMA destination address to data structure table index bits which point to a data structure table entry of a subsegment of contiguous data structure entries; and said virtual address converting includes obtaining a plurality of buffer physical addresses at said data structure table entry of said data structure table at said obtained data structure table entry physical address and pointed to by said data structure table index bits.

36. The system of claim 31 wherein the identified data structure entry of said subsegment of contiguous data structure entries contains a data structure which contains a plurality of index bits of said second virtual address which identify a segment descriptor entry of said segment descriptor table of contiguous segment descriptors.

37. The system of claim 36 wherein said second virtual address further includes a plurality of subsegment descriptor table index bits which identify a subsegment descriptor entry of a subsegment descriptor table of subsegment descriptors of the plurality of subsegment descriptor tables.

38. The system of claim 37 wherein said second virtual address further includes a plurality of data structure table index bits which identify a data structure entry of a subsegment of contiguous data structure entries, which contains a plurality of physical addresses of a buffer and said memory operation performing includes transferring data at said buffer physical addresses.

39. A network adapter subsystem for use with a computer system having a system memory, comprising:

a device driver adapted to store in said system memory a translation and protection table of virtually contiguous data structures and wherein said translation and protection table is subdivided into a plurality of segments and each segment is subdivided into a plurality of subsegments and each subsegment is subdivided in to a plurality of contiguous data structure entries of said translation and protection table and wherein said driver is adapted to store in said system memory a plurality of subsegment descriptor tables, each subsegment descriptor table being a subsegment descriptor table of contiguous subsegment descriptors, each subsegment descriptor including a physical address of a subsegment of contiguous data structure entries of said translation and protection table and to store in said adapter a segment descriptor table of contiguous segment descriptors, each segment descriptor including a physical address of a subsegment descriptor table of contiguous subsegment descriptors of the plurality of subsegment descriptor tables; and a network adapter adapted to:

receive a memory operation address for a memory operation;

convert said received address to a first virtual address of a first indexed physical address within said translation and protection table of virtually contiguous data structures wherein said translation and protection table contains at said first indexed physical address, protection data and a second virtual address a second indexed physical address within said translation and protection table wherein said translation and protection table contains at said second indexed physical address a physical address of a buffer and wherein said first virtual address includes a first plurality of segment descriptor table index bits which identify a first segment descriptor table entry of said segment descriptor table of contiguous segment descriptors, each segment descriptor including a physical address of a subsegment descriptor table of contiguous subsegment descriptors of the plurality of subsegment descriptor tables and wherein said second virtual address is different from said first virtual address, and said second indexed physical address is different from said first indexed physical address;

convert said virtual address to said first indexed physical address of said first data structure table entry wherein said first virtual address converting includes obtaining a first subsegment descriptor table physical address at said first segment descriptor table entry of said segment descriptor table identified by said first plurality of segment descriptor table index bits;

obtaining said protection data at said first indexed physical address of said translation and protection table;

perform said memory operation including protection checking using said protection data obtained at said first indexed physical address;

obtain said second virtual address at said first indexed physical address of said translation and protection table from said first at least one data structure wherein said second virtual address includes a second plurality of segment descriptor table index bits which identify a second segment descriptor table entry of said segment descriptor table of contiguous segment descriptors and wherein second plurality of segment descriptor table index bits is different from said first plurality of segment descriptor table index bits, said second segment descriptor table entry is different from said first segment descriptor table entry;

convert said second virtual address to said second indexed physical address wherein said second virtual address converting includes obtaining a second subsegment descriptor table physical address at said second segment descriptor table entry of said segment descriptor table identified by said second plurality of segment descriptor table index bits;

obtaining said buffer physical address at said second indexed physical address of said translation and protection table;

wherein said memory operation performing further includes transferring data at said buffer at said buffer physical address obtained at said second indexed physical address.

40. The subsystem of claim 39 wherein said system memory includes a buffer and said translation and protection table contains at said second indexed physical address a plurality of physical addresses of a buffer and said memory operation performing includes transferring data at said buffer physical addresses.

41. The subsystem of claim 39 wherein said memory operation address includes a buffer identifier and at least one of a virtual address and offset within a buffer.

42. The subsystem of claim 39 wherein said first virtual address further includes a plurality of subsegment descriptor table index bits which identify a subsegment descriptor entry of a subsegment descriptor table of subsegment descriptors of the plurality of subsegment descriptor tables.

43. The subsystem of claim 42 wherein said first virtual address further includes a plurality of data structure table index bits which identify a data structure entry of said subsegment of contiguous data structure entries.

44. The subsystem of claim 43 wherein said receiving includes receiving a destination address for a Remote Direct Memory Access (RDMA) memory operation; said received address converting includes converting a portion of said RDMA destination address to segment descriptor table index bits which point to a segment descriptor table entry.

45. The subsystem of claim 44 wherein said first virtual address converting includes obtaining a subsegment descriptor table physical address at said segment descriptor table entry pointed to by said segment descriptor table index bits.

46. The subsystem of claim 45 wherein said received address converting includes converting a portion of said RDMA destination address to subsegment descriptor table index bits which point to a subsegment descriptor table entry; and said virtual address converting includes obtaining said first indexed physical address at said subsegment descriptor table entry of a subsegment descriptor table descriptors of the plurality of subsegment descriptor tables, at said obtained subsegment descriptor table physical address and pointed to by said subsegment descriptor table index bits.

47. The subsystem of claim 46 wherein said received address converting includes converting a portion of said RDMA destination address to data structure table index bits which point to a data structure table entry of a subsegment of contiguous data structure entries; and said virtual address converting includes obtaining a plurality of buffer physical addresses at said data structure table entry of said data structure table at said obtained data structure table entry physical address and pointed to by said data structure table index bits.

48. The subsystem of claim 43 wherein the identified data structure entry of said subsegment of contiguous data structure entries contains a data structure which contains a plurality of index bits of said second virtual address which identify a segment descriptor entry of said segment descriptor table of contiguous segment descriptors.

49. The subsystem of claim 48 wherein said second virtual address further includes a plurality of subsegment descriptor table index bits which identify a subsegment descriptor entry of a subsegment descriptor table of subsegment descriptors of the plurality of subsegment descriptor tables.

50. The subsystem of claim 49 wherein said second virtual address further includes a plurality of data structure table index bits which identify a data structure entry of a subsegment of contiguous data structure entries, which contains a plurality of physical addresses of a buffer and said memory operation performing includes transferring data at said buffer physical addresses.

* * * * *